(12) United States Patent
Sauter et al.

(10) Patent No.: US 9,690,064 B2
(45) Date of Patent: Jun. 27, 2017

(54) MULTI-GANG CASSETTE SYSTEM

(71) Applicant: Leviton Manufacturing Co., Inc., Melville, NY (US)

(72) Inventors: Tom Sauter, Seattle, WA (US); Gary Bernstein, Bothell, WA (US)

(73) Assignee: Leviton Manufacturing Co., Ltd., Melville, NY (US)

( * ) Notice: Subject to any disclaimer, the term of this patent is extended or adjusted under 35 U.S.C. 154(b) by 0 days.

(21) Appl. No.: 14/937,817

(22) Filed: Nov. 10, 2015

(65) Prior Publication Data

US 2017/0131500 A1    May 11, 2017

(51) Int. Cl.
*G02B 6/00*    (2006.01)
*G02B 6/44*    (2006.01)

(52) U.S. Cl.
CPC .......... *G02B 6/4452* (2013.01); *G02B 6/4455* (2013.01)

(58) Field of Classification Search
CPC .. G02B 6/4452; G02B 6/3897; G02B 6/4471; G02B 6/4453; G02B 6/4454
See application file for complete search history.

(56) References Cited

U.S. PATENT DOCUMENTS

| | | | |
|---|---|---|---|
| 4,283,150 A | 8/1981 | Hanazono et al. | |
| 4,528,728 A | 7/1985 | Schmidt et al. | |
| 4,659,119 A | 4/1987 | Reimert | |
| 4,692,809 A | 9/1987 | Beining et al. | |
| 4,944,568 A | 7/1990 | Danbach et al. | |
| 5,004,866 A | 4/1991 | Cooke et al. | |
| 5,312,263 A | 5/1994 | Zapalski et al. | |
| 5,713,752 A | 2/1998 | Leong et al. | |
| 5,781,366 A | 7/1998 | Matsuoka | |

(Continued)

FOREIGN PATENT DOCUMENTS

| CN | 203012204 U | 6/2013 |
|---|---|---|
| CN | 203573012 U | 4/2014 |

(Continued)

OTHER PUBLICATIONS

International Search Report for PCT/US2012/049554 dated Feb. 26, 2013, 3 pages.

(Continued)

*Primary Examiner* — Jennifer Doan
(74) *Attorney, Agent, or Firm* — Amin, Turocy & Watson LLP

(57) ABSTRACT

A cassette mounting system allows fiber optic cassettes of different sizes to be mounted on the same fiber optic tray or other mounting surface. Cassettes configured for use in the system comprise rails on the left and right sides of the cassette, which are configured to engage with rail guides on the fiber optic tray to facilitate mounting the cassettes on the tray. Adjacent guide rails on the tray define cassette bays within which single-gang cassettes can be installed. Multi-gang cassettes are also configured with clearance areas between the gangs that allow guide rails to reside underneath the cassette when mounted on the tray, allowing both multi-gang cassettes and single-gang cassettes to be installed on the tray. The cassettes include integrated front-facing release mechanisms that can be easily accessed from the front of the tray to facilitate unlocking the cassettes and removing the cassettes from the tray.

20 Claims, 17 Drawing Sheets

(56) References Cited

U.S. PATENT DOCUMENTS

| | | |
|---|---|---|
| 6,485,322 B1 | 11/2002 | Branch et al. |
| 6,607,308 B2 | 8/2003 | Dair et al. |
| 6,626,697 B1 | 9/2003 | Martin et al. |
| 6,796,715 B2 | 9/2004 | Chiu et al. |
| 7,298,946 B2 | 11/2007 | Mueller |
| 7,347,633 B2 | 3/2008 | Minota |
| 7,473,131 B2 | 1/2009 | Dunwoody et al. |
| 7,689,089 B2 | 3/2010 | Wagner et al. |
| 7,841,779 B1 | 11/2010 | Bianchini et al. |
| 8,147,272 B2 | 4/2012 | Rhein |
| 8,337,243 B2 | 12/2012 | Elkhatib et al. |
| 8,740,478 B2 | 6/2014 | Weberpals |
| 8,781,284 B2 | 7/2014 | Bragg |
| 8,958,680 B2 | 2/2015 | Bragg |
| 9,077,126 B2 | 7/2015 | Bragg |
| 9,236,691 B2 | 1/2016 | Bragg |
| 2002/0131122 A1 | 9/2002 | Anderl et al. |
| 2005/0208822 A1 | 9/2005 | Ishigami et al. |
| 2006/0103140 A1 | 5/2006 | Bella et al. |
| 2008/0025683 A1 | 1/2008 | Murano |
| 2009/0138637 A1 | 5/2009 | Hargreaves et al. |
| 2010/0322580 A1 | 12/2010 | Beamon et al. |
| 2011/0177710 A1 | 7/2011 | Tobey |
| 2012/0106911 A1* | 5/2012 | Cooke .................. G02B 6/4452 385/135 |
| 2014/0226946 A1 | 8/2014 | Cooke et al. |
| 2016/0116697 A1 | 4/2016 | Kostecka et al. |

FOREIGN PATENT DOCUMENTS

| | | |
|---|---|---|
| CN | 204925469 U | 12/2015 |
| CN | 205787267 U | 12/2016 |

OTHER PUBLICATIONS

Notice of allowance for U.S. Appl. No. 13/564,495 dated Mar. 6, 2014, 22 pages.
Notice of allowance for U.S. Appl. No. 14/295,599 dated Oct. 23, 2014, 21 pages.
Notice of allowance for U.S. Appl. No. 14/447,460 dated Mar. 3, 2015, 19 pages.
International Search Report for International Application No. PCT/US2016/060907 dated Feb. 22, 2017, 5 pages.
Written Opinion for International Application No. PCT/US2016/060907 dated Feb. 22, 2017, 4 pages.

* cited by examiner

MULTI-GANG CASSETTE SYSTEM

TECHNICAL FIELD

The disclosed subject matter relates to a fiber optic cassette system, and, for example, to a cassette system that allows cassettes of different sizes to be installed within the same cassette mounting system.

BACKGROUND

Fiber optic cables are often used as a medium for telecommunication and computer networking due to their flexibility, high data capacity, and immunity to interference. Since light is used as the data transmission medium, fiber optic cables can carry data over long distances with little attenuation relative to electrical data transmission. Fiber optic cables are used in many types of applications, including local area networks that use optical transceivers, corporate intranets that deploy optical pathways for high-speed transmission of data on a corporate campus, or other such data transmission applications.

Fiber optic cassettes are often used to organize and manage fiber optic connections within telecommunication wiring enclosures. An example cassette-based system may include a fiber optic enclosure within which are installed one or more fiber optic trays, with one or more fiber optic cassettes mounted on each tray. Such cassette-based systems are typically designed around a single size of cassette.

The above-described deficiencies of the conventional technologies are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more example embodiments described herein relate to a fiber optic cassette system designed to allow multiple different sizes of cassettes to be mounted within the system. To this end, cassette trays of the system are configured with cassette mounting interfaces that work in conjunction with specially designed single-gang and multi-gang cassettes to allow both single-gang and multi-gang cassettes to be mounted on the same tray simultaneously.

Both single-gang and multi-gang cassettes configured for use within the cassette system described herein can comprise rails on the right and left side of the cassette. When the cassette is installed through the front of the cassette tray, the rails on either side of the cassette engage with rail guides formed on the tray to guide the cassette into position. In order to lock the cassettes in place on the tray, both single-gang and multi-gang cassettes include a latching mechanism on the left side, on the right side, or in a middle section of the cassette. The latching mechanism can comprise a latching tab configured to engage with an aperture in the surface of the cassette tray when the cassette is fully engaged with the guide rail (that is, when the cassette reaches a designated stopping position), thereby securing the cassette in place on the tray. A front-facing release latch at the front end of the latching mechanism can be actuated to disengage the latching tab from the aperture, freeing the cassette for removal through the front of the cassette system. In one or more embodiments, the rail guides comprise sections of the tray surface that are raised to form ledges with which the cassette rails engage.

It is to be understood that both the foregoing general description and the following detailed description are intended to provide an overview or framework for understanding the nature and character of the disclosure. The accompanying drawings are included to provide a further understanding, the drawings illustrate various embodiments, and together with the description serve to explain the principles and operation of the concepts disclosed.

However, these aspects are indicative of a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
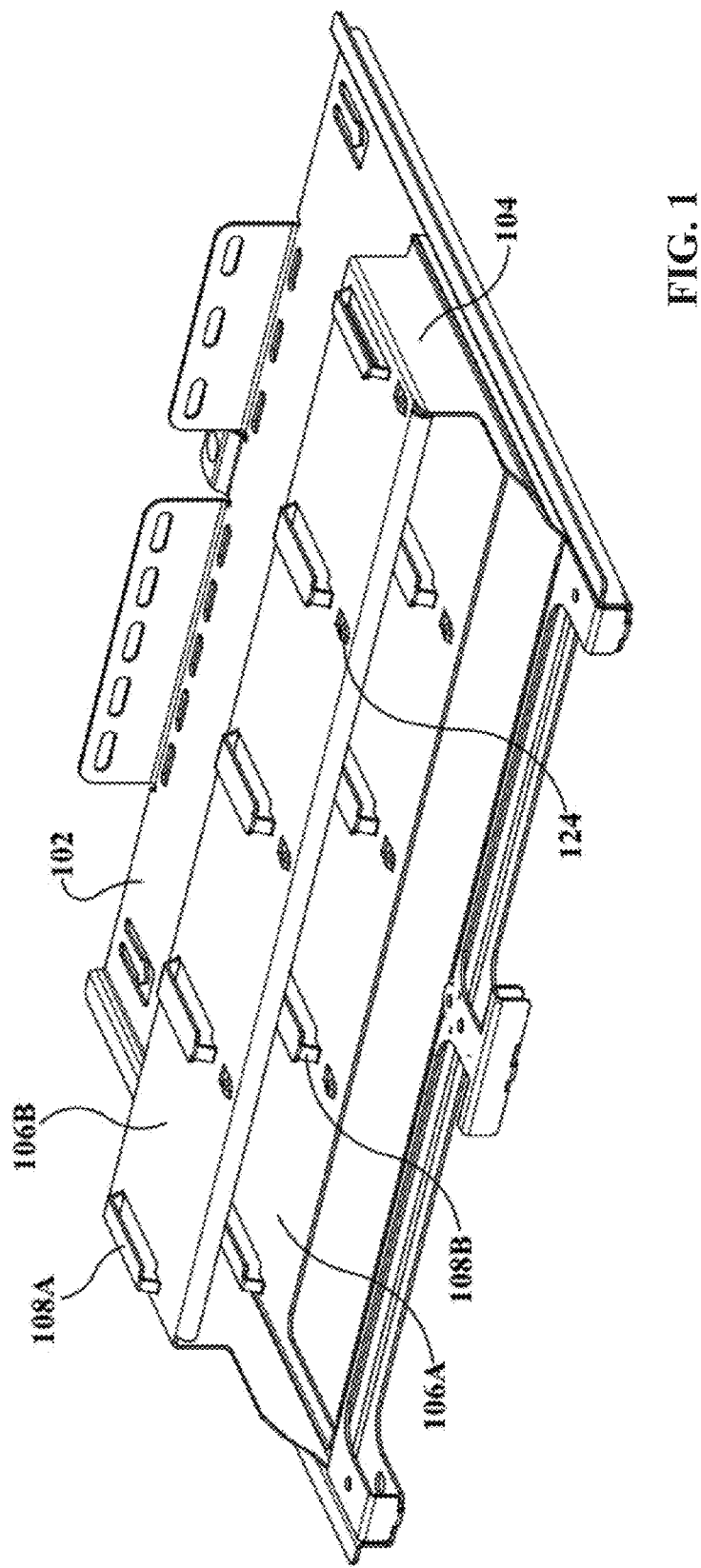
FIG. 1 is a three-dimensional view of an example fiber optic tray that includes a cassette mounting system.

The subject application now will be described more fully hereinafter with reference to the accompanying figures, in which example embodiments of the subject application are shown. The various embodiments may, however, be embodied in many alternate forms and should not be construed as limited to the example embodiments set forth herein, but on the contrary, the subject application is to cover all modifications, equivalents, and alternatives falling within the spirit and scope of the subject application as defined by the claims. The example embodiments may be combined, other embodiments may be utilized, and structural changes may be made without departing from the spirit or scope of the subject application.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, to the extent that the terms "includes," "has," "possesses," and the like are used in the detailed description, claims and drawings, such terms are intended to be inclusive in a manner similar to the term "comprising" as "comprising" is interpreted when employed as a transitional word in a claim.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Moreover, articles "a" and "an" as used in the subject specification and annexed drawings should generally be construed to mean "one or more" unless specified otherwise or clear from context to be directed to a singular form.

Moreover, the word "exemplary" is used herein to mean serving as an example, instance, or illustration. Any aspect or design described herein as "exemplary" is not necessarily to be construed as preferred or advantageous over other aspects or designs.

In the following description, for purposes of explanation, numerous specific details are set forth in order to provide a thorough understanding of the subject disclosure. It may be evident, however, that the subject disclosure may be practiced without these specific details. The subject disclosure is now described with reference to the drawings wherein like reference numerals are used to refer to like elements throughout.

As noted in the background, fiber optic cassettes, either single-gang or multi-gang, used within a given enclosure are typically configured in uniform shapes or sizes. Discrete and size specific cassette bays in conventional telecommunication wiring enclosures are not typically configured to accommodate variously sized or shaped cassettes.

A fiber optic cassette system according to one or more embodiments described herein comprises one or more cassette trays on which cassettes of various sizes can be mounted. Rail guides on the cassette trays are configured to interface with corresponding rails of both single-gang and multi-gang cassettes to facilitate guiding the rails into position on the trays. The cassettes themselves have a structure that, in conjunction with the rail guide design, allows both single-gang and multi-gang cassettes to be mounted simultaneously and in various positions on a given tray. As such, different sizes of cassettes or adapter plates can be installed on the cassette tray without modification of the cassette system. A spring-loaded latching mechanism integrated in the cassette housing includes a latching tab or protrusion that engages with an aperture on the tray when the cassette is fully engaged with the rail guides. The latching mechanism includes a front-facing release latch that, when actuated, disengages the latching tab from the aperture, allowing the cassettes to be removed through the front of the tray. The latching tab comprises the sole locking point between the cassette and the tray, and thus the cassette can be unlocked for removal from the tray by actuating a single release latch that is easily accessible from the front of the tray (or from the front of the enclosure in which the tray is disposed). The trays can be installed within a fiber optic enclosure to facilitate management and organization of fiber optic connections.

FIG. 1 is a three-dimensional view of an example fiber optic tray 102 that includes a cassette mounting system according to one or more embodiments. The tray 102 is shown without cassettes in FIG. 1 for clarity. Example tray 102 is designed to hold multiple fiber optic cassettes, and to be installed in a fiber optic enclosure. It is to be appreciated, however, that the features described herein for mounting cassettes of different sizes on a common cassette mounting system are not limited to use in such fiber optic trays, but rather are applicable to any system in which fiber optic cassettes are to be mounted on a surface for management and organization of fiber optic connections.

The example tray 102 depicted in FIG. 1 comprises two rows of cassette bays 106—a lower row (including cassette bay 106A) located on the main tray surface, and an upper row (including cassette bay 106B) located on a raised mounting interface 104 that is elevated above the main tray surface. Each cassette bay 106 is defined by a pair of parallel rail guides 108 on the left and right sides of the bay. The rail guides 108 are designed to interface with rails located along the left and right sides of the respective cassettes or adapter plates, as will be described in more detail below. The rail guides 108 are spaced substantially equidistant along the respective mounting surfaces, such that the space between adjacent rail guides 108 generally corresponds to the width of a single-gang cassette to be mounted on the tray 102. As will be described in more detail below, since multi-gang cassettes are wider than single-gang cassettes by multiple factors (e.g., a dual-gang cassette is approximately twice as wide as a single-gang cassette, a three-gang cassette is approximately three times as wide as a single-gang cassette, etc.), a multi-gang cassette will span more than one rail guide. In one or more embodiments, each cassette bay 106 has an associated locking aperture 124 disposed on the mounting surface near one of the guide rails. As will be described in more detail below, the locking aperture 124 is configured to receive a spring-loaded locking protrusion built into the cassette to facilitate locking the cassette in place within the cassette bay 106.

Figure 2:
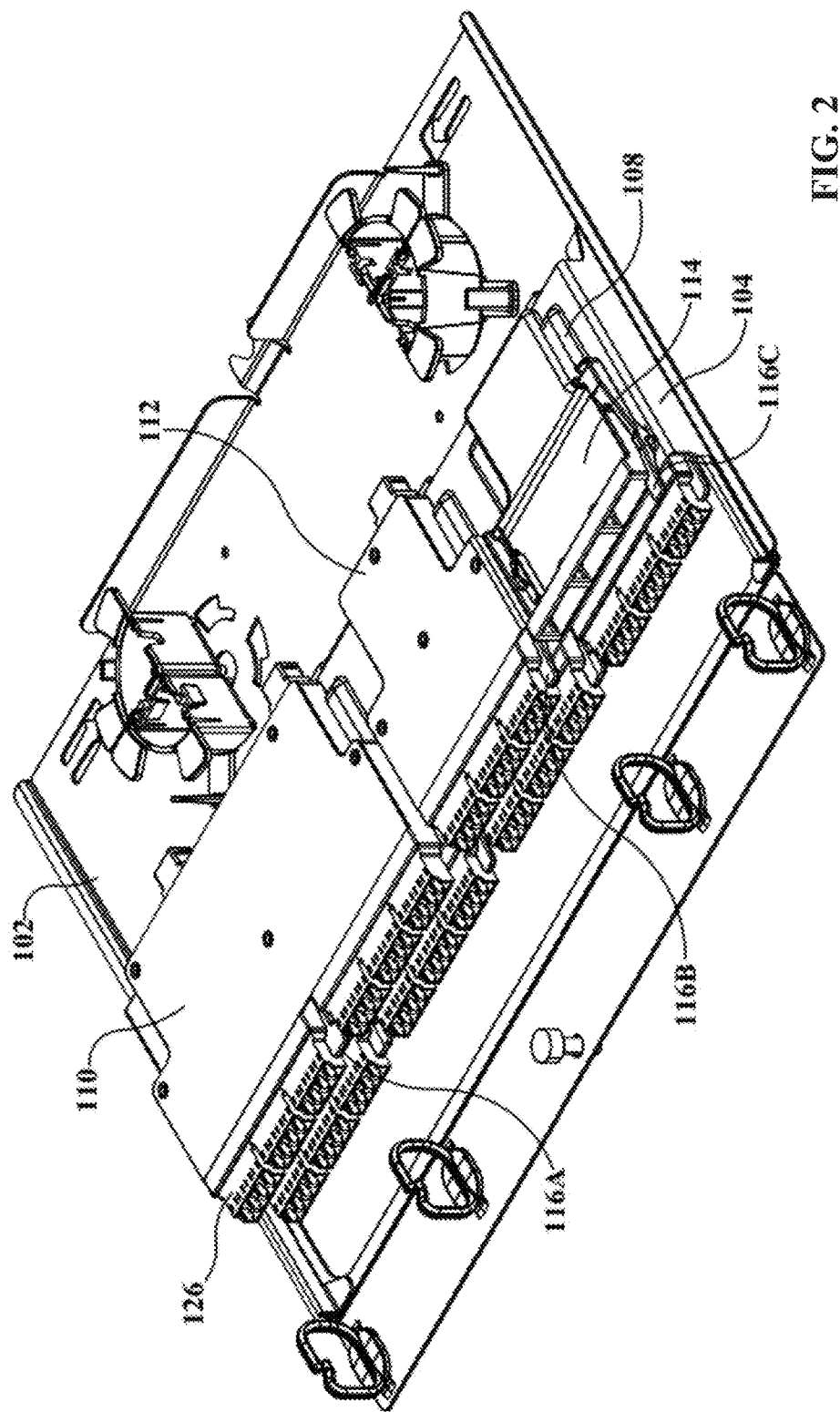
FIG. 2 is a three-dimensional view of the example fiber optic cassette tray with a number of cassettes and adapter plates installed thereon.
Figure 3:
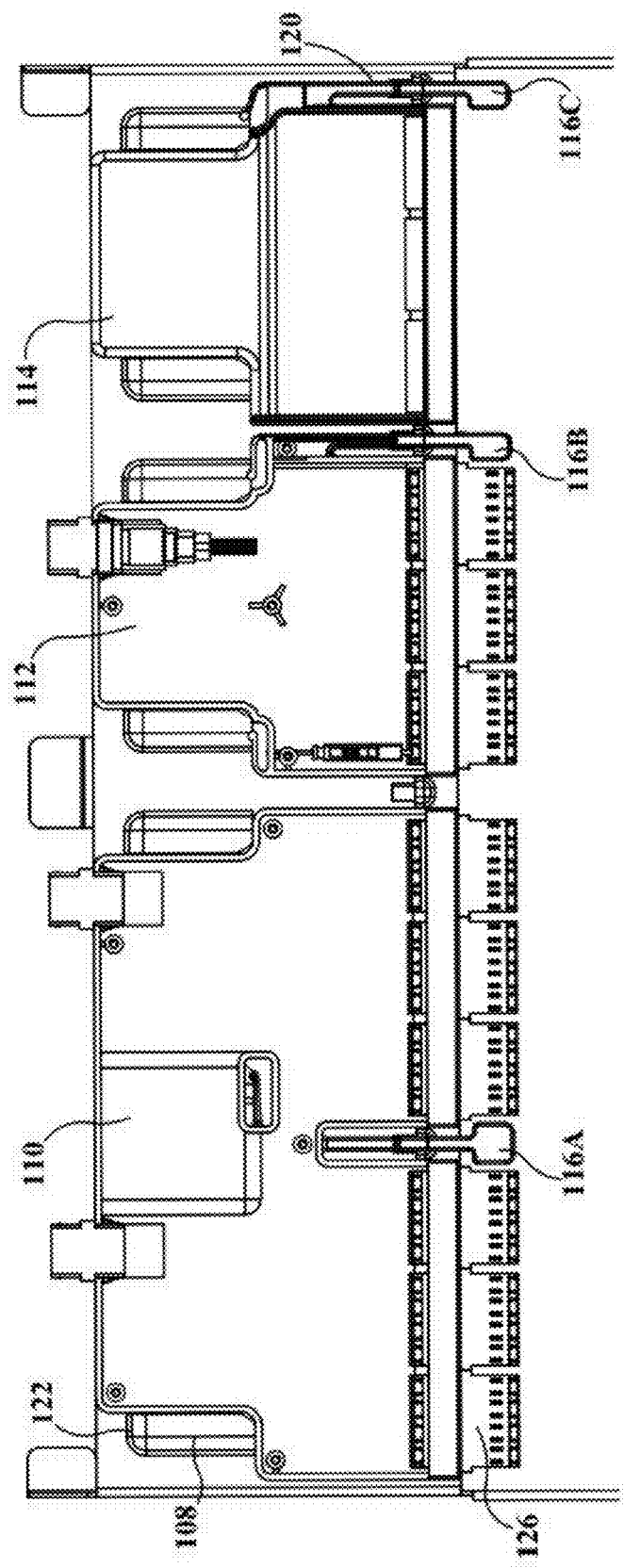
FIG. 3 is a top view of a mounting interface on which are mounted a number of fiber optic cassettes of different sizes.

FIG. 2 is a three-dimensional view of the example fiber optic cassette tray 102 with a number of cassettes and adapter plates installed thereon, and FIG. 3 is a top view of the installed cassettes. As shown in FIGS. 2 and 3, the cassette mounting system allows a user to mount cassettes of different sizes (e.g., both single-gang and multi-gang cassettes) on the same cassette tray 102 simultaneously at any position on the mounting interfaces. In the example depicted in FIGS. 2 and 3, a single-gang cassette 112, a dual-gang cassette 110, and a single-gang adapter plate 114 are mounted on the upper mounting interface 104 of tray 102 in selected positions. As described in more detail below, any combination of single-gang cassettes (or adapter plates) and multi-gang cassettes (or adapter plates) can be disposed simultaneously on the upper and lower mounting interfaces of the cassette tray 102 subject to overall space limitations of the mounting surfaces. The cassettes and adapter plates are held in place on the tray by rail guides 108, which interface with rails located along the left and right sides of the respective cassettes and adapter plates. When a cassette is installed from the front of the tray 102, the rail guides 108 ensure that the cassette is oriented in the correct position on the tray. Notches 406 disposed on the cassette rails engage with notches on the front-facing ends of the rail guides 108, preventing the cassettes from over-traveling through the rear of the tray as the cassette is being installed between two rail guides. Thus, the rail guides 108 prevent rearward and sideways movement of the cassette when the cassette is fully installed between the rail guides.

Throughout this disclosure, it is to be understood that the structural features described herein area intended for use with both fiber optic cassettes and fiber optic adapter plates. Accordingly, mounting features described in connection with either a cassette or an adapter plate are to be understood to be equally applicable to both cassettes and adapter plates.

Figure 4:
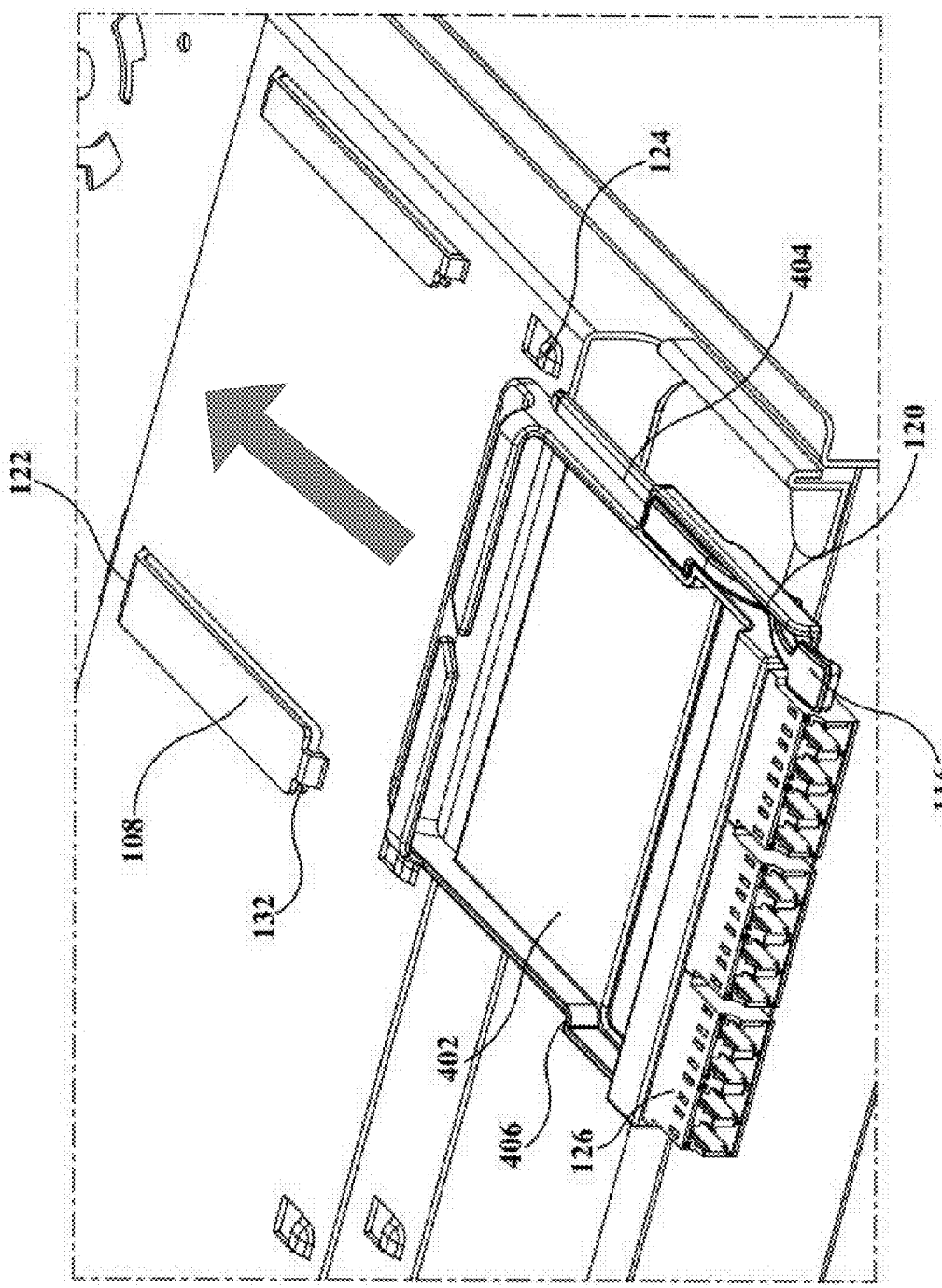
FIG. 4 is a three-dimensional view illustrating installation of an example single-gang adapter plate into a cassette bay of a mounting interface.

FIG. 4 is a three-dimensional view illustrating installation of an example single-gang adapter plate into a cassette bay of the upper mounting interface 104 of tray 102 (single-gang cassettes can also be installed in a similar manner). As shown in this figure, each rail guide 108 comprises an elongated section of the mounting surface that is raised to form a ledge on both sides of the elongated section. The front-facing end 132 of each rail guide 108 is notched on the left and right side in order to allow the rails 404 of the adapter plate 402 or cassette to enter the rail guides 108 and pass under the ledges of the rail guides 108.

After the rails 404 have entered the front end of their respective rail guides 108, the adapter plate 402 or cassette can be pushed rearward until notches 406 disposed on the rails 404 engage with the front-facing end 132 of the rail guides. This engagement prevents continued rearward movement of the adapter plate 402 or cassette when the adapter plate 402 or cassette is fully installed on the mounting interface, ensuring that the adapter plate 402 or cassette is correctly located on the tray. The rear-facing end 122 of each rail guide 108 is not notched, creating a secondary stopping mechanism to prevent the adapter plate 402 or cassette from over-traveling beyond the rear side of the rail guides.

The cassettes and adapter plates include integrated latching mechanisms 120 that lock the cassettes and adapter plates in place on the mounting interface when fully installed on the tray. For example, adapter plate 402 reaches the stopping position (e.g., when the notches 406 of the rails 404 engage with the front-facing end 132 of the rail guides), a locking protrusion of the latching mechanism 120 engages with an aperture 124 on the mounting surface (see also FIG. 1 for another view of the relative locations of the apertures 124 relative to the rail guides). Thus, when the adapter plate 402 is fully installed and locked into position, the rail guides 108 prevent rearward and sideways movement of the adapter plate 402, while the locking tab of latching mechanism 120 prevents forward and rearward movement of the adapter plate 402. The cassettes of the present cassette mounting system—both single-gang and multi-gang—include similar integrated latching mechanisms 120. Although the illustrations depict the integrated latching mechanism as comprising a locking protrusion that interfaces with an aperture 124, some embodiments of the cassette system may include other types of latching mechanisms without departing from the scope of this disclosure.

The latching mechanisms 120 include front-facing release latches 116. Actuating the release latch 116 disengages the locking protrusion of the latching mechanism 120 from the mounting surface and unlocks the adapter plate 402 or cassette, allowing the adapter plate 402 or cassette to be removed through the front of the tray 102. As shown in FIGS. 2 and 3, single-gang cassette 112 and adapter plate 114 include release latches 116B and 116C located on the right side of their respective housings, while double-gang cassette 110 includes a release latch 116A located in a middle section between the two gangs of the cassette. Each release latch 116 is accessible from the front of the tray, allowing the user to easily access the release latch from the front.

Figure 5:
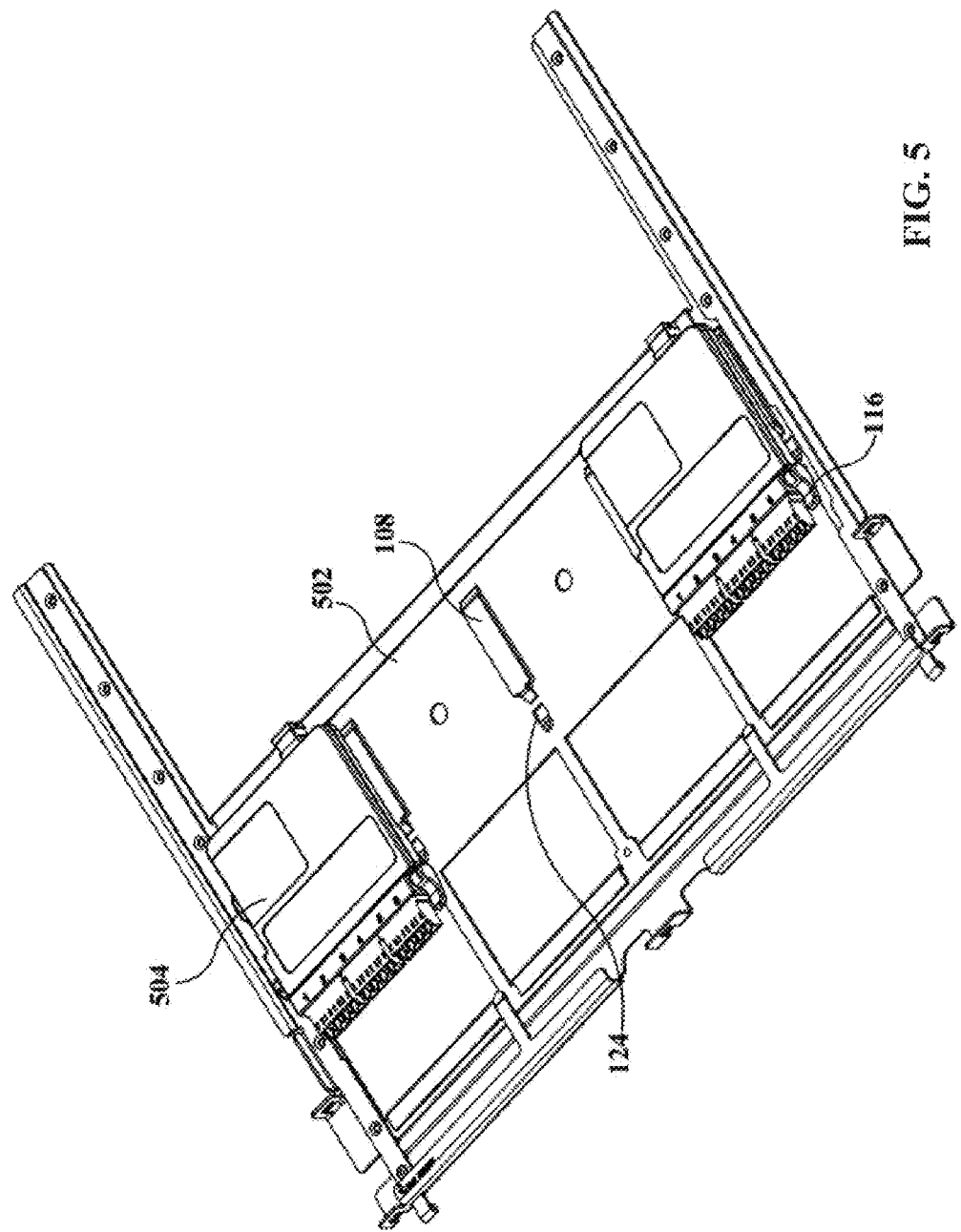
FIG. 5 is a view of a single-layer cassette tray, on which are mounted two single-gang cassettes.

In the example cassette tray system illustrated in FIGS. 1-4, the cassette tray 102—with its upper and lower rows of cassette bays—is designed to allow two-layered stacking of cassettes and adapter plates. However, it is to be appreciated that this two-layered configuration is only intended to be exemplary, and that trays configured to allow stacking of more than two layers are within the scope of one or more embodiments described herein. As the number of layers increases, the density of the cassettes and/or adaptor plates is also increased, thereby increasing the connectivity density of the enclosure in which the tray is installed. Similarly, the cassette mounting features described herein can also be implemented on single-layer cassette trays. FIG. 5 is a view of a single-layer cassette tray 502 on which are mounted two single-gang cassettes 504. In this example, the single-gang cassettes 504 are installed on the left-most and right-most cassette bays, respectively, leaving two adjacent empty cassette bays in the middle of the tray. The mounting interface features described herein allow the user to install either two more single-gang cassettes in these two empty cassette bays, or to install one double-gang cassette spanning the two adjacent cassette bays. As described below, structural features of the double-gang cassette (and other multi-gang cassettes having more than two gangs) allow the cassette to be installed on the same cassette mounting system without physically modifying the cassette or the mounting interface.

Figure 6:
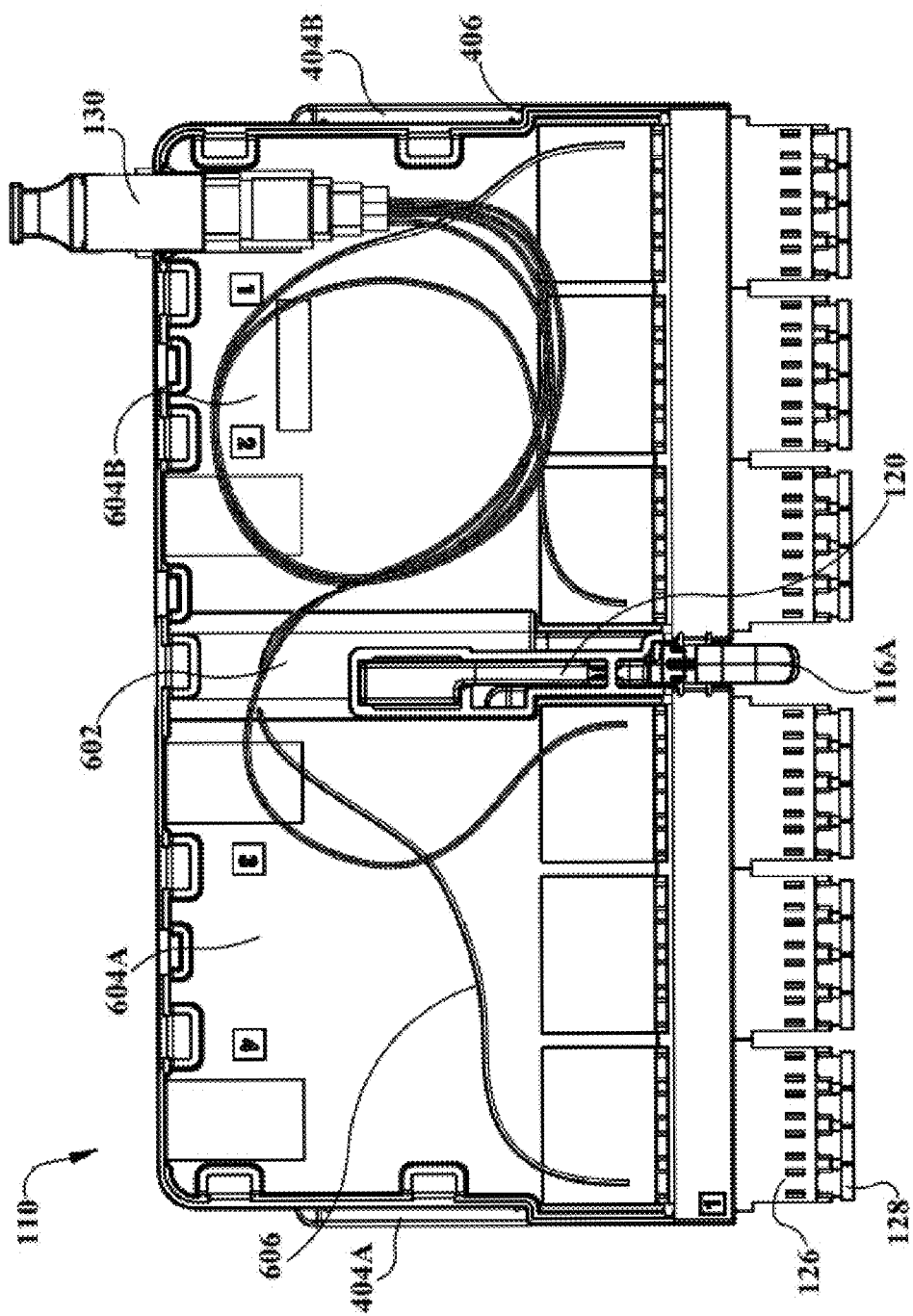
FIG. 6 is a top view of an example double-gang cassette with the top of the cassette housing removed to expose the interior of the cassette.
Figure 7:
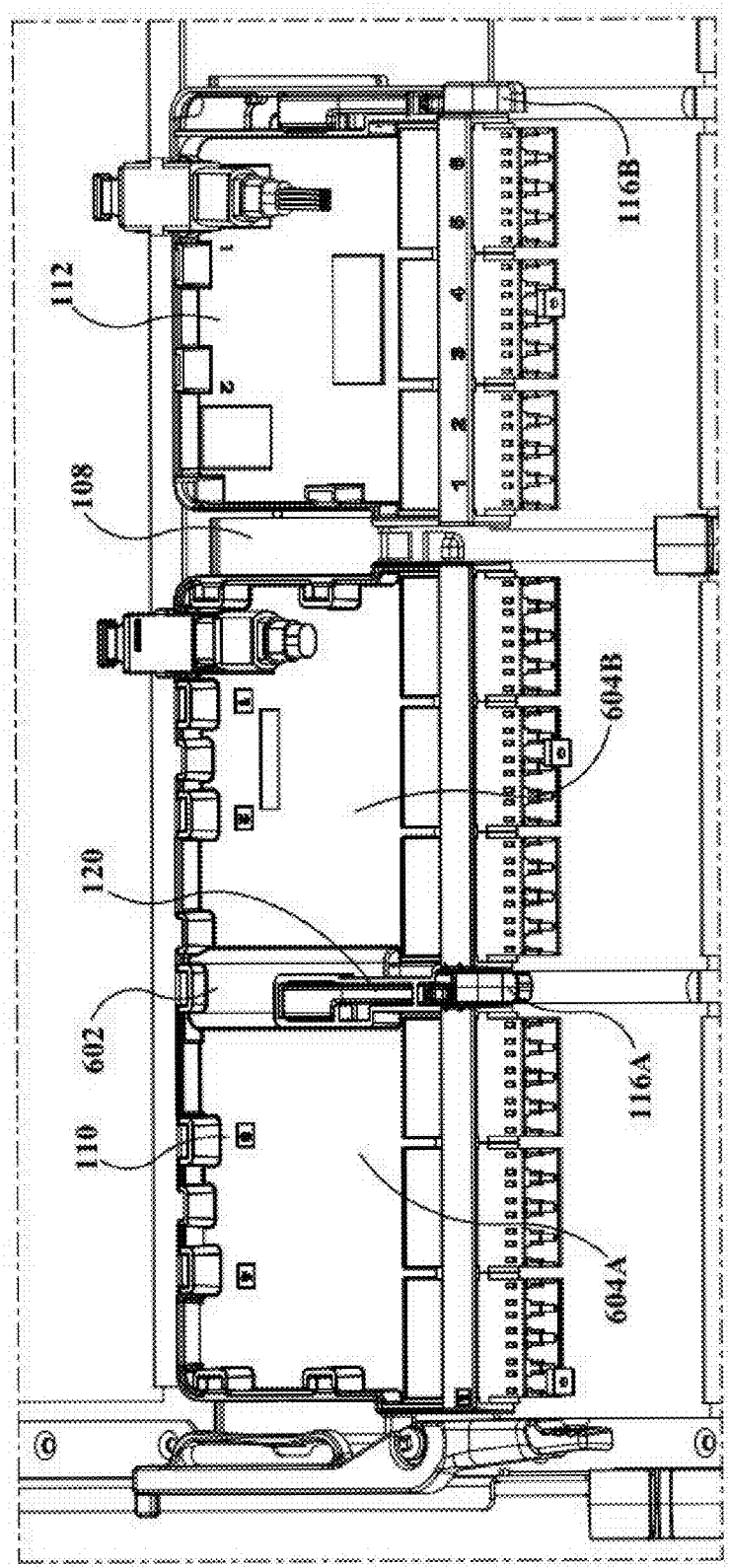
FIG. 7 is a top view depicting a double-gang cassette and a single-gang cassette mounted on the same cassette tray.

FIG. 6 is a top view of example dual-gang cassette 110 with the top of the cassette housing removed to expose the interior of the cassette 110, and FIG. 7 is a top view depicting dual-gang cassette 110 and single-gang cassette 112 mounted on the same cassette tray (also with the top of the cassette housings removed). Dual-gang cassette 110 comprises a first gang 604A and a second gang 604B within which optical fibers and/or cables can be routed. As described in previous examples, a pair of rails 404A and 404B are disposed on the left and right side, respectively, of the cassette 110. These rails are configured to interface with rail guides 108 on the cassette tray to facilitate guiding and holding the cassette 110 into place on the tray.

Figure 8:
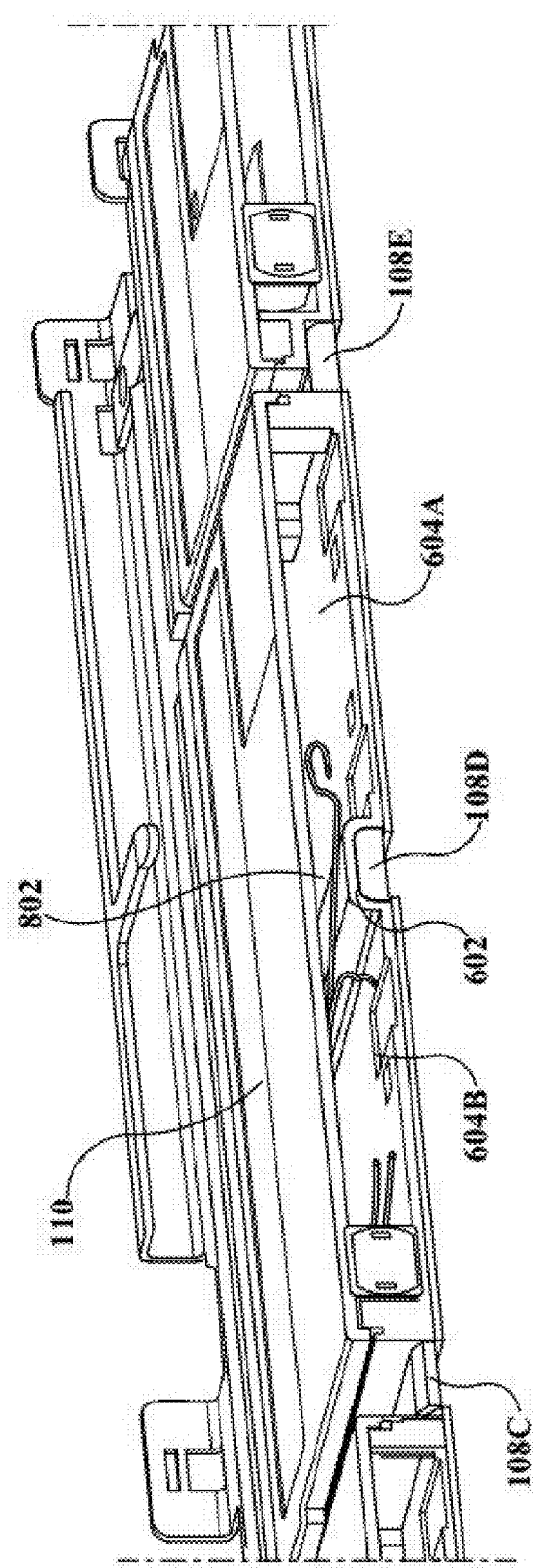
FIG. 8 is a cross-sectional view of a double-gang cassette installed on a mounting interface of a tray.

Whereas a single-gang cassette 112 or adapter plate 114 will interface with two adjacent rail guides 108 when installed on the mounting interface of the tray (that is, the two adjacent rail guides on either side of a single cassette bay 106), a double-gang cassette will interface with three rail guides 108. This is illustrated in FIG. 8, which is a cross-sectional view of a dual-gang cassette 110 installed on the mounting interface of a tray. As shown in this figure, non-adjacent rail guides 108C and 108E interface with rails 404A and 404B (obscured in FIG. 8, located below rail guides 108C and 108E) to hold dual-gang cassette 110 in place on the mounting surface. Since dual-gang cassette 110 is approximately twice the width of single-gang cassette (which is designed to fit between two adjacent rail guides), the dual-gang cassette 110 also spans an intermediate rail guide 108D. This intermediate rail guide 108D is located underneath a middle portion of the cassette 110 corresponding to the joint area between the two gangs 604A and 604B. In order to accommodate this intermediate rail guide 108D, a clearance area 602—such as a slot or raised area—is formed along the bottom surface of the cassette 110 between the two gangs 604A and 604B. This clearance area 602 allows the intermediate rail guide 108D to pass underneath the cassette 110 when the cassette is installed on the mounting surface. The interaction between the intermediate rail guide 108D and the slot or groove formed by the clearance area 602 can also assist in properly aligning the cassette on the mounting surface as the cassette is being installed on the tray. As can be seen in FIG. 8, the clearance area 602 is designed to leave sufficient space 802 between the top of the clearance area 602 and the ceiling of the cassette housing to allow optical fibers to pass easily between the two gangs 604A and 604B.

Multi-gang cassettes having more than two gangs can generally conform to a design similar to that described above for the dual-gang cassette 110. For example, a three-gang cassette would interface with four rail guides when installed on the mounting interface of a tray or other mounting surface—to rail guides that interface with the rails on the left and right sides of the cassette, and two intermediate rail guides. Accordingly, the three-gang cassette would include clearance areas between each pair of adjacent gangs in order to accommodate the two intermediate rail guides.

Figure 9:
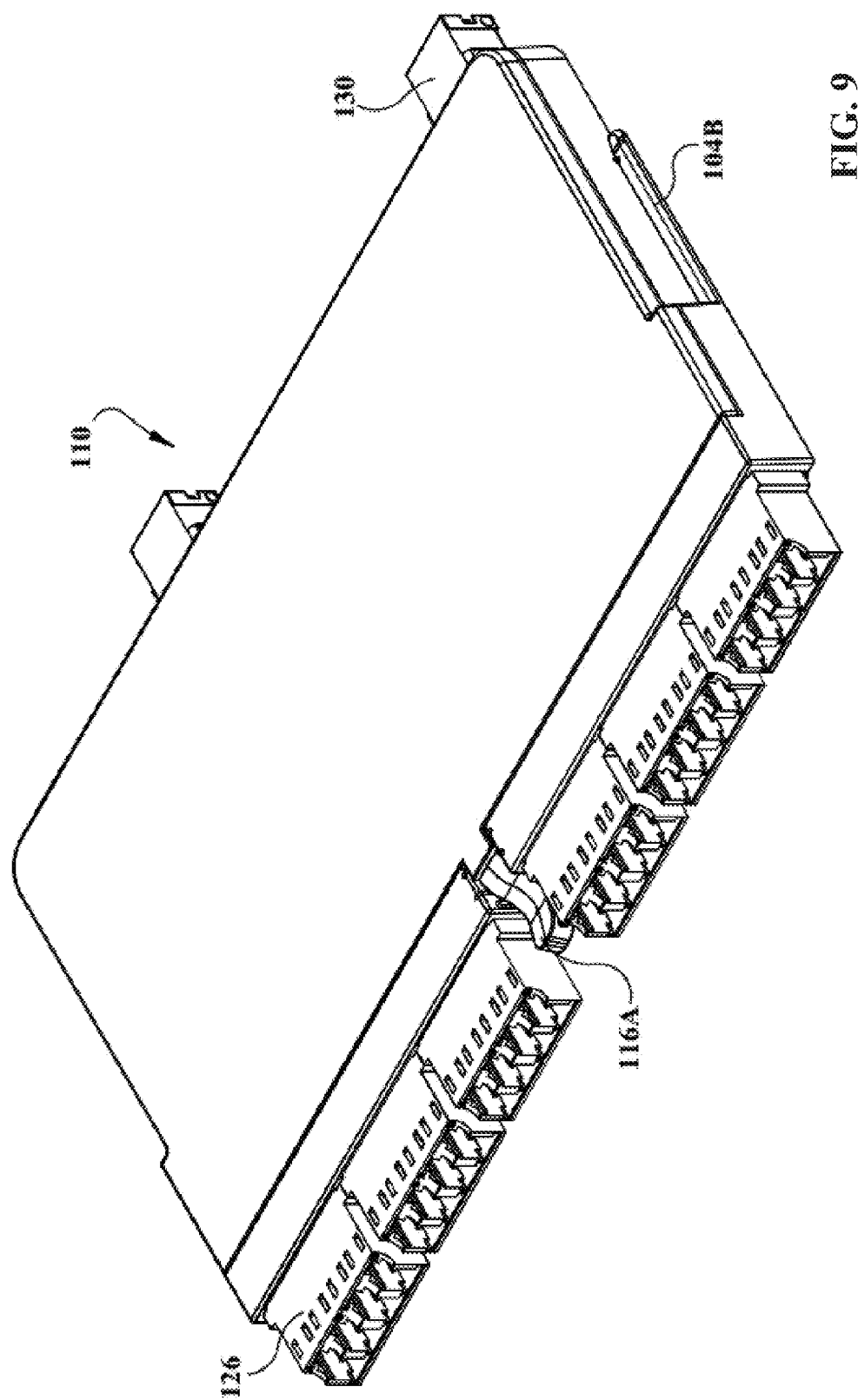
FIG. 9 is a three-dimensional view of a dual-gang cassette.

As shown in FIGS. 6 and 7 (as well as FIG. 9, which is a three-dimensional view of the dual-gang cassette 110), the latching mechanism 120 for the example dual-gang cassette 110 is disposed in a middle section of the cassette between the two gangs 604A and 604B, with release latch 116A protruding from the front of the cassette 110. However, in some embodiments, the latching mechanism 120 for a double-gang cassette can be located on the left or right side of the cassette, similar to single-gang cassettes. Similarly, for multi-gang cassettes having more than two gangs, the latching mechanism 120 can be located between any two adjacent gangs of the cassette, or on either the left or right side of the cassette.

Fiber optic connectivity features of the example cassettes depicted in the drawings are now described in connection with FIG. 6. However, it is to be appreciated that the mounting system described above for installing fiber optic cassettes and adapter plates of different sizes within the same fiber optic cassette system is not limited to use with the particular fiber optic cassettes depicted in the drawings, but rather can implemented in cassettes having alternative fiber optic connectivity features without deviating from the scope of this disclosure.

As shown in FIG. 6 (as well as FIGS. 2-5), each cassette is configured to hold a horizontal row of fiber optic adapters 126 along the front edge of the cassette. Each adapter 126 is configured to receive multiple fiber optic connectors (dust caps 128 of which are shown in FIG. 6), which may be used to terminate respective optical fibers to be plugged into the adapters 126. An interfacing connector 130 is disposed on the rear side of the cassette 110. Individual fibers 606 of a fiber optic cable entering the cassette through the interfacing connector 130 can be broken out inside the cassette and terminated on the rear sides of fiber optic adapters 126 (in the case of adapter plates, unbundled individual fibers—rather than a fiber optic cable—may enter through the rear of the adapter plate). The adapters 126 provide connectivity between the fibers 606 terminated on the rear sides of adapters 126 and the fibers terminated on the front sides of adapters 126 using the fiber optic connectors. Although FIG. 6 depicts adapters 126 that are configured to receive Lucent connectors (LC connectors), cassettes that accommodate other fiber optic connector types are also within the scope of one or more embodiments described herein. In various embodiments, the fiber optic cassettes can be configured to accept single-fiber connectors (e.g., LC, Standard Connector, etc.) and multi-fiber connectors (e.g., mechanical transfer pull-off, multi-fiber push-on, etc.)

Figure 10:
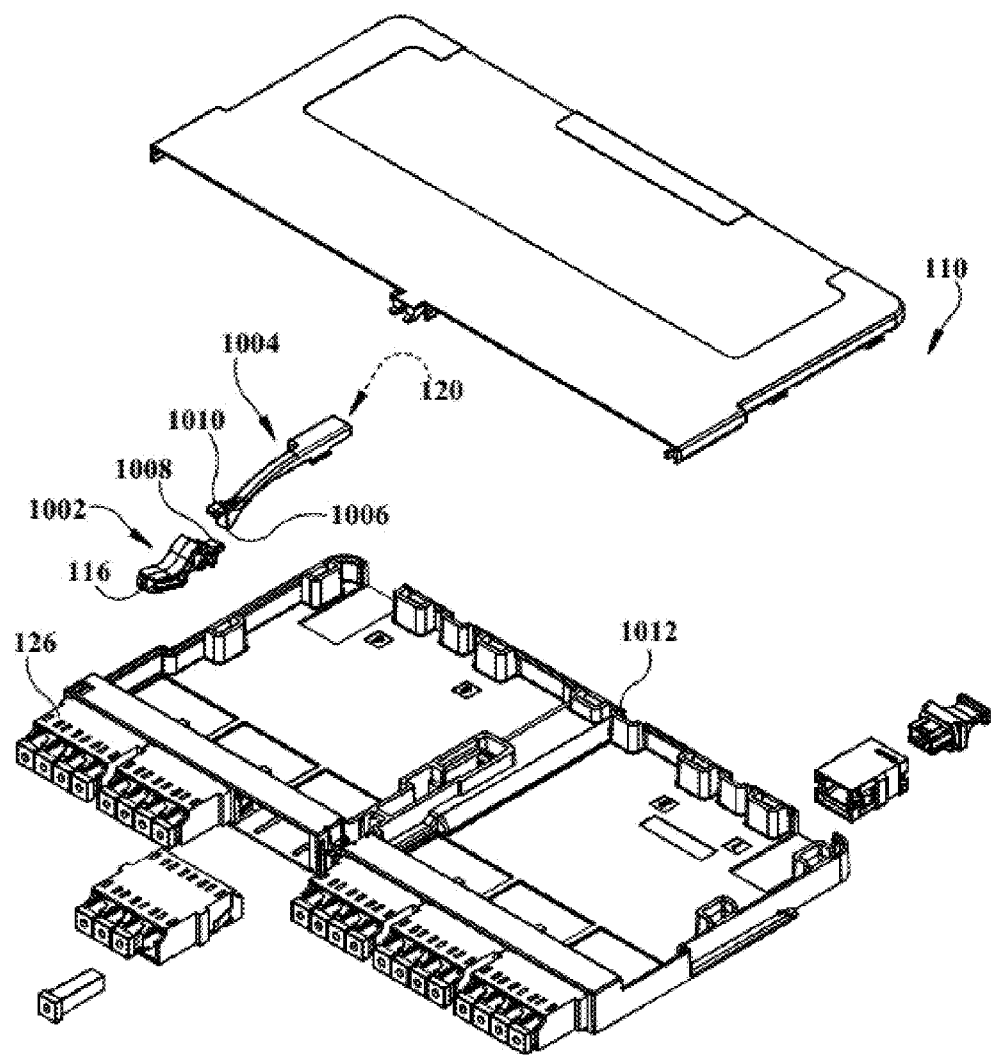
FIG. 10 is an exploded view of a dual-gang cassette depicting components of a latching mechanism integrated into the cassette housing.

FIG. 10 is an exploded view of dual-gang cassette 110 depicting components of the latching mechanism 120. Although the latching mechanism 120 is described in connection with a dual-gang cassette in FIG. 10, it is to be appreciated that the same latching mechanism design can be implemented in single-gang cassettes, other multi-gang cassettes having more than two gangs, and both single- and multi-gang adapter plates.

Latch mechanism 120 can comprise a spring 1004 (e.g., a leaf spring or other spring mechanism) and a release mechanism 1002. Spring 1004 includes a locking protrusion 1006 on the bottom of the front end of the spring 1004 configured to engage with an aperture 124 disposed on the mounting surface of the cassette tray near a rail guide 108 (see FIGS. 1, 4, 5 for views of apertures 124), thereby locking the cassette in place on the tray when installed (see, e.g., FIG. 4 and the associated description above). Release mechanism 1002 includes the release latch 116 that facilitates disengagement of the locking protrusion 1006 from the aperture and removal of the cassette through the front of the tray.

Figure 11:
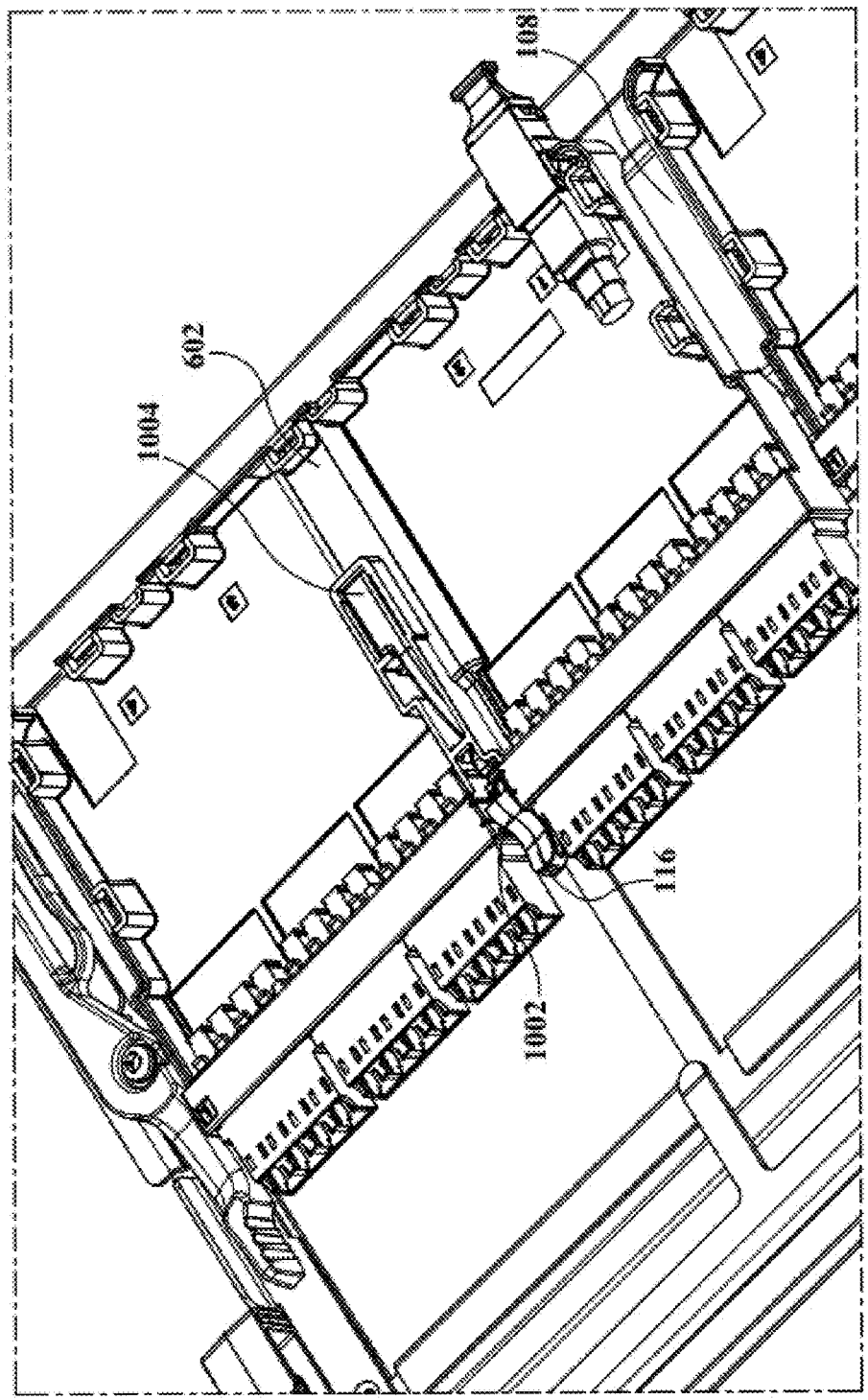
FIG. 11 is a view depicting a spring and release mechanism disposed within a dual-gang cassette.
Figure 12:
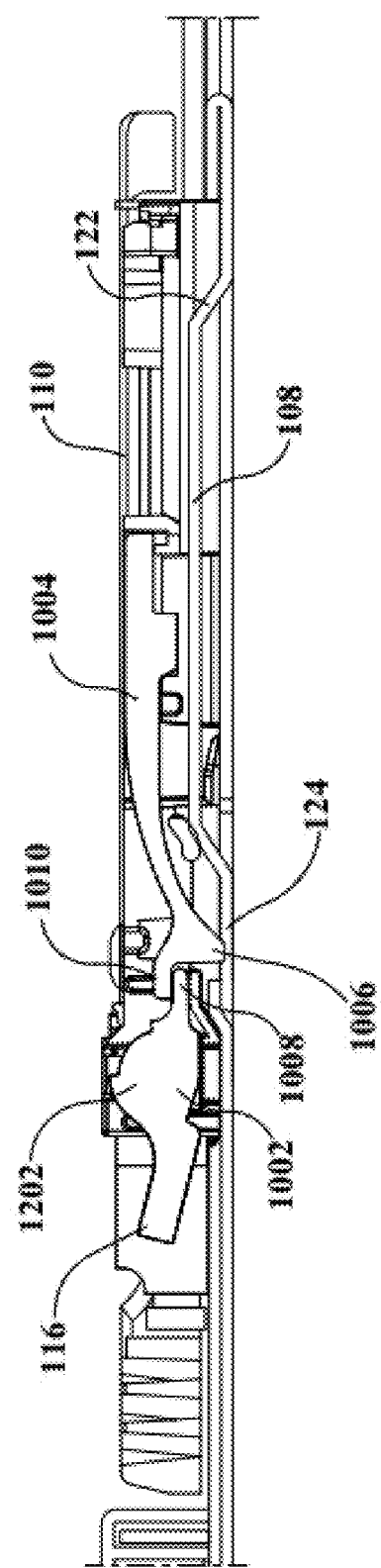
FIG. 12 is a cross-sectional side view of a cassette that illustrates interaction between a release mechanism and a spring of a latching mechanism integrated into the housing of the cassette.
Figure 13:
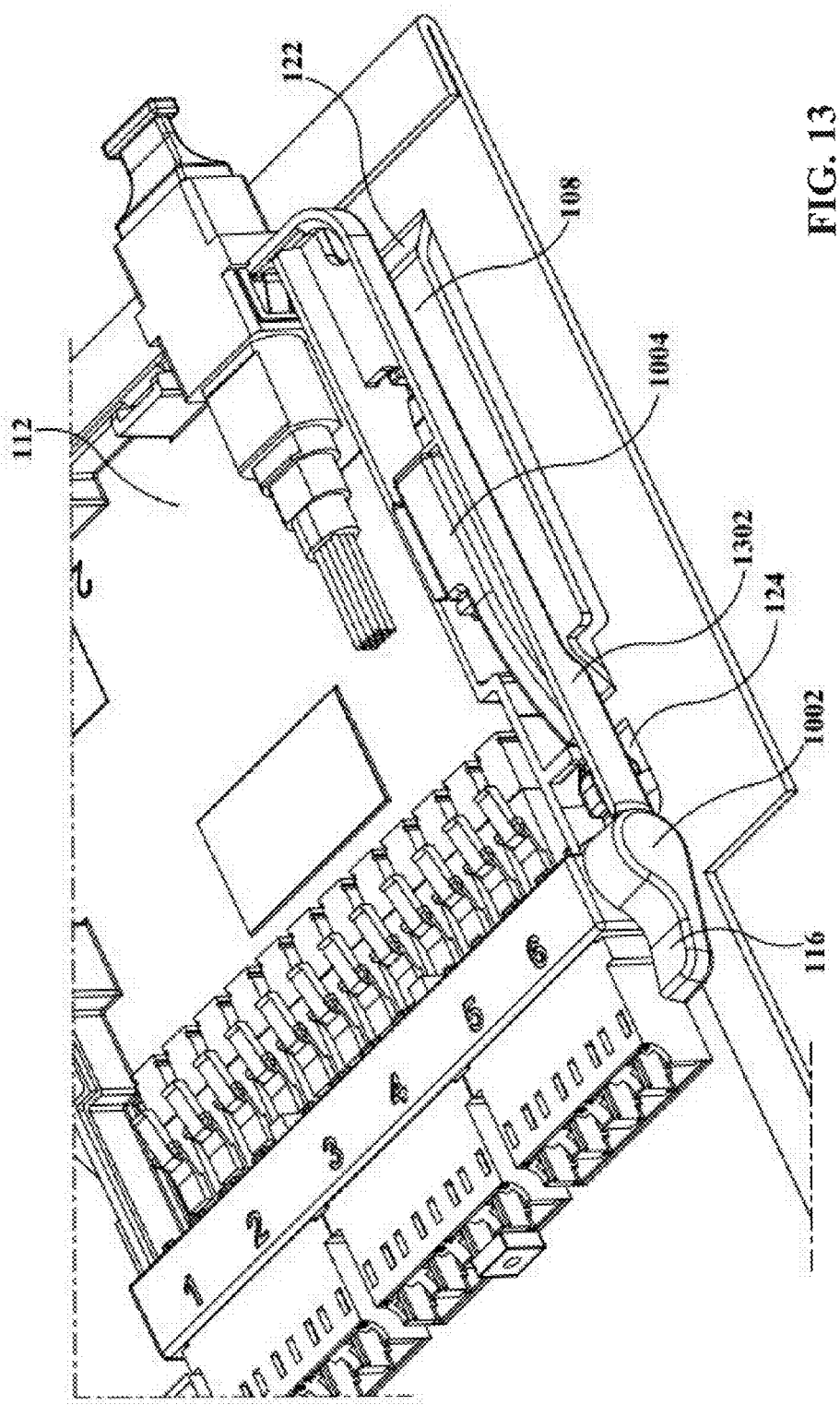
FIG. 13 depicts a cassette fully installed on a tray and locked in position.

In the example dual-gang cassette depicted in FIG. 10, the latching mechanism 120 is disposed in the middle area of the dual-gang cassette (e.g., above the rail clearance area 602). FIG. 11 is a view depicting the spring 1004 and release mechanism 1002 disposed within the dual-gang cassette. As shown in this figure, the latching mechanism comprising the spring 1004 and release mechanism 1002 resides within a recessed area formed in a middle section of the cassette, above the clearance area 602. FIG. 12 is a cross-sectional side view of the cassette 110 that illustrates the interaction between the release mechanism 1002 and the spring 1004. FIG. 13 depicts the cassette 110 fully installed on a tray or other mounting surface and locked in position. As described above in connection with FIG. 4, as the cassette is being inserted between a pair of rail guides 108, locking protrusion 1006 will be received by aperture 124 when the cassette reaches the stopping position. Downward pressure applied by spring 1004 is translated to the locking protrusion 1006, ensuring that the locking protrusion 1006 remains engaged with aperture 124 until the release mechanism is actuated.

When downward pressure is applied to the release latch 116—which may be a button, a lever, or other type of pressure-actuated mechanism—the release mechanism 1002 rotates about a pivot area 1202. This pivoting action causes a first tab 1008 on the release mechanism 1002 to apply upward pressure on a second tab 1010 on the end of spring 1004, counteracting the downward pressure applied by the spring 1004 and lifting the locking protrusion clear of the aperture 124. Thus disengaged, the cassette 110 can then be removed from the tray by pulling the cassette toward the front of the tray.

Figure 14:
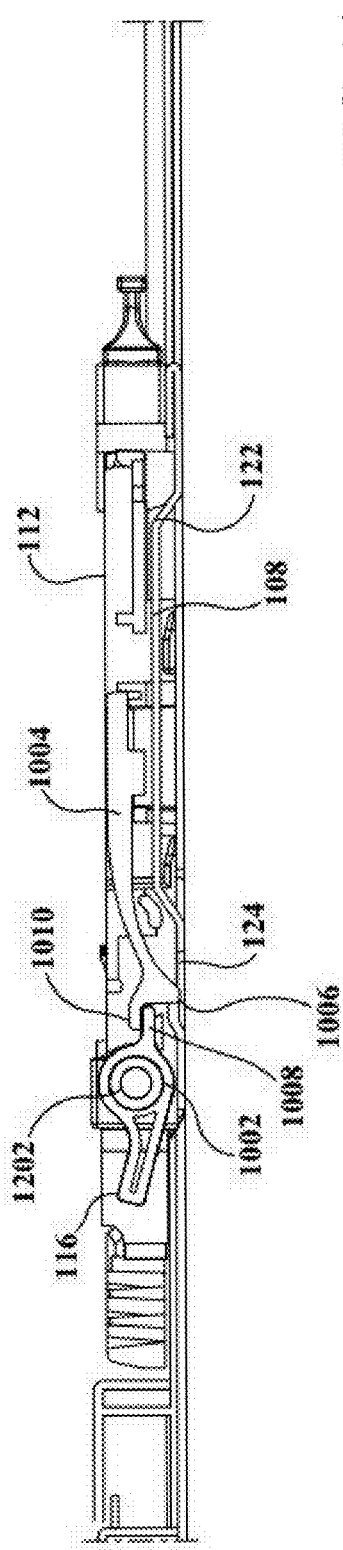
FIG. 14 is a cross-sectional side view of a single-gang cassette.

As noted above, a similar latching mechanism can be used for single-gang cassettes. FIG. 13 is a view depicting spring 1004 and release mechanism 1002 disposed within a single-gang cassette 112, and FIG. 14 is a cross-sectional side view of the single-gang cassette 112 installed on a tray. In this example, the latching mechanism comprising release spring 1004 and release mechanism 1002 are disposed within a walled area 1302 on the right side of the single-gang cassette 112. However, in some embodiments the latching mechanism can be disposed on the left side of the cassette without deviating from the scope of this disclosure. The spring 1004 and release mechanism 1002 operate in the same manner as described above in connection with the dual-gang cassette.

Although FIGS. 10-14 depict the latching mechanism as comprising a release latch 116 that is actuated downward, causing the locking protrusion 1006 to pivot upward in order to clear the aperture 124, other types of latching mechanisms are also within the scope of one or more embodiments of this disclosure. For example, in some embodiments the latching mechanism 120 may be configured such that the protrusion faces sideways in order to engage with a notch or aperture in the rail guide 108. In such embodiments, the release latch 116 may be configured to be actuated to the left or right in order to disengage the protrusion from the notch or aperture.

Figure 15:
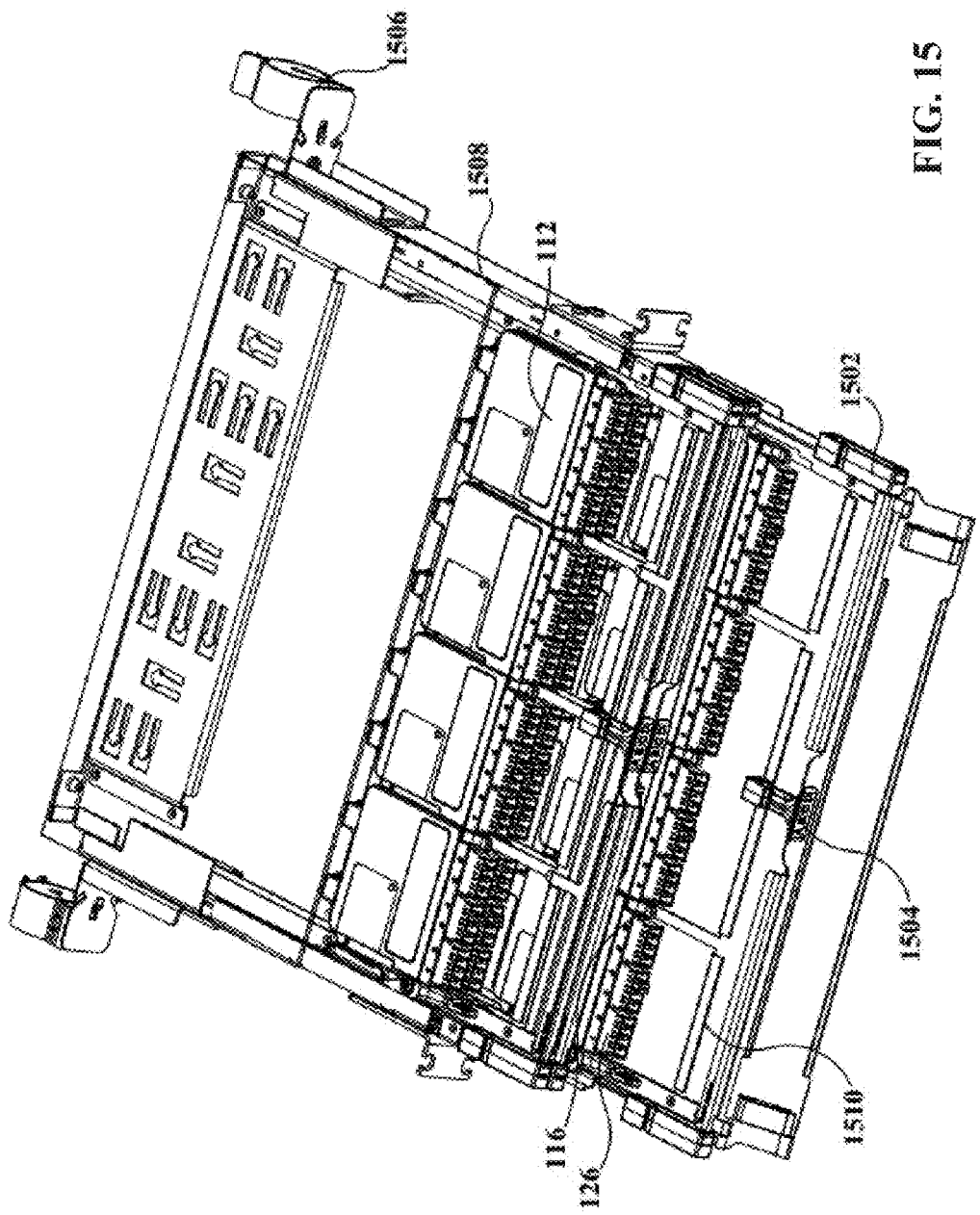
FIG. 15 is a three-dimensional view of a fiber optic enclosure in which are installed a number of fiber optic cassette trays.

As noted above, the fiber optic cassette mounting system described herein can be incorporated in fiber optic cassette systems in which fiber optic cassettes and/or adapter plates are mounted to cassette trays, which can then be installed in a fiber optic enclosure. FIG. 15 is a three-dimensional view of a fiber optic enclosure 1508 in which are installed a number of fiber optic cassette trays 1510. In this example system, the fiber optic cassette trays 1510 include rail guides on their upper surface similar to those described in previous examples. The rail guides interface with rails and (in the case of multi-gang cassettes) clearance areas of the cassettes in a manner that allows cassettes of different sizes to be installed on the same tray within the system (the example illustrated in FIG. 15 depicts only single-gang cassettes 112 installed on trays 1510; however, in accordance with the design features described above, different sizes of cassettes can be installed on the trays 1510 within enclosure 1508). As a result of the structural features described above—e.g., the placement and design of the rail guides on the mounting surfaces, inclusion of rail clearance areas located between the gangs of the multi-gang cassettes, etc.—any combination of single-gang and multi-gang cassettes can be installed on a given tray 1510, subject to space limitations of the tray.

As described in previous examples, each cassette 112 has an integrated latching mechanism, where each latching mechanism includes a release latch 116 facing toward the front of the tray 1510. This configuration allows a user to easily access and actuate the release latch 116 from the front of the enclosure 1508, thereby unlocking the cassette and allowing the cassette to be removed through the front of the tray 1510.

As shown in FIG. 15, multiple cassette trays 1510 can be stacked within the enclosure 1508. In some embodiments, each tray 1510 can include a central cable management ring 1504 (e.g., a T-shaped ring) on a front edge of the tray. Also, end cable management rings 1502 can be disposed on the left and right ends of the front edge of the tray 1510. These cable management rings can be used to bundle optical fibers entering the cassette through the adapters 126 on the front of the cassettes, and to route the bundled fibers neatly along the front edge of the tray 1510. Additionally, strain relief cable guides 1506 are disposed on the left and right rear corners of the enclosure 1508. Fiber optic cables entering the rear of the enclosure can pass through these strain relief cable guides 1506 to prevent over-stretching of the cables.

Figure 16:
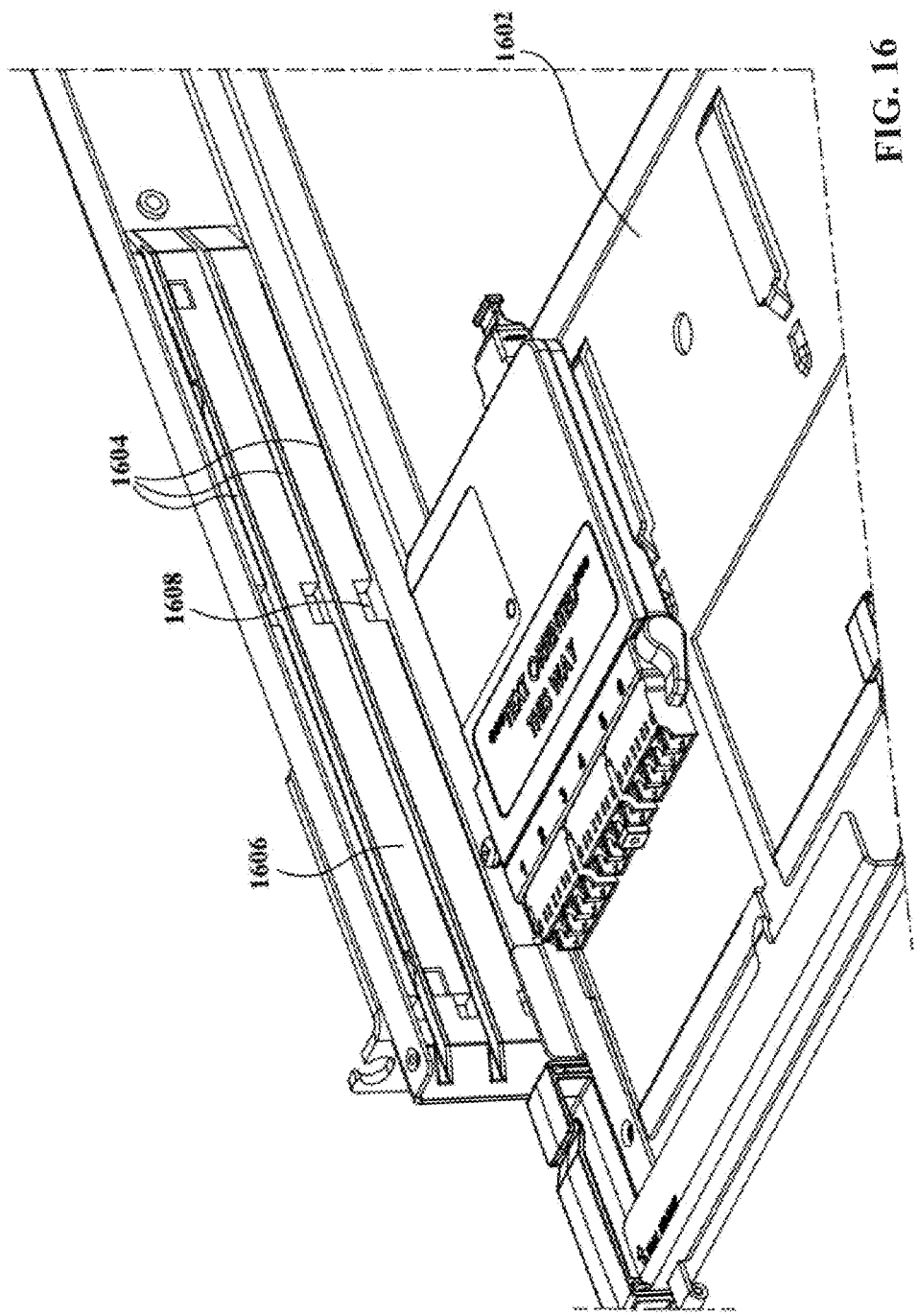
FIG. 16 is a view depicting an example cassette tray being installed within an enclosure.

Enclosure 1508 is configured to hold multiple trays 1510 in a stacked formation. FIG. 16 is a view depicting an example cassette tray 1602 being installed within an enclosure. In this example, cassette tray 1602 is inserted through the front opening of the enclosure, such that the left and right edges of the cassette trays engage with corresponding guide channels 1604 formed in left and right tray guides 1606 mounted on the inside left and right inside walls of the enclosure 1508 (FIG. 16 shows only the left tray guide for clarity). The guide channels 1604 guide the tray 1602 into the correct position within the enclosure. One or more locking indentations 1608 located near each guide channel 1604 are configured to receive a corresponding spring-loaded locking tab of a tray latch mounted to the side of the tray 1602 when the rear edge of the tray 1602 reaches the end of travel at the rear end of the guide channel, thereby locking the tray 1602 in place within the enclosure.

The enclosure system depicted in FIGS. 15 and 16 is only intended to be an example, non-limiting system in which the cassette mounting features described herein can be implemented, and it is to be appreciated that the mounting interface features described above for installing cassettes of different sizes on the same cassette mounting surface can be implemented within the context of any type of fiber optic cassette mounting system.

Figure 17:
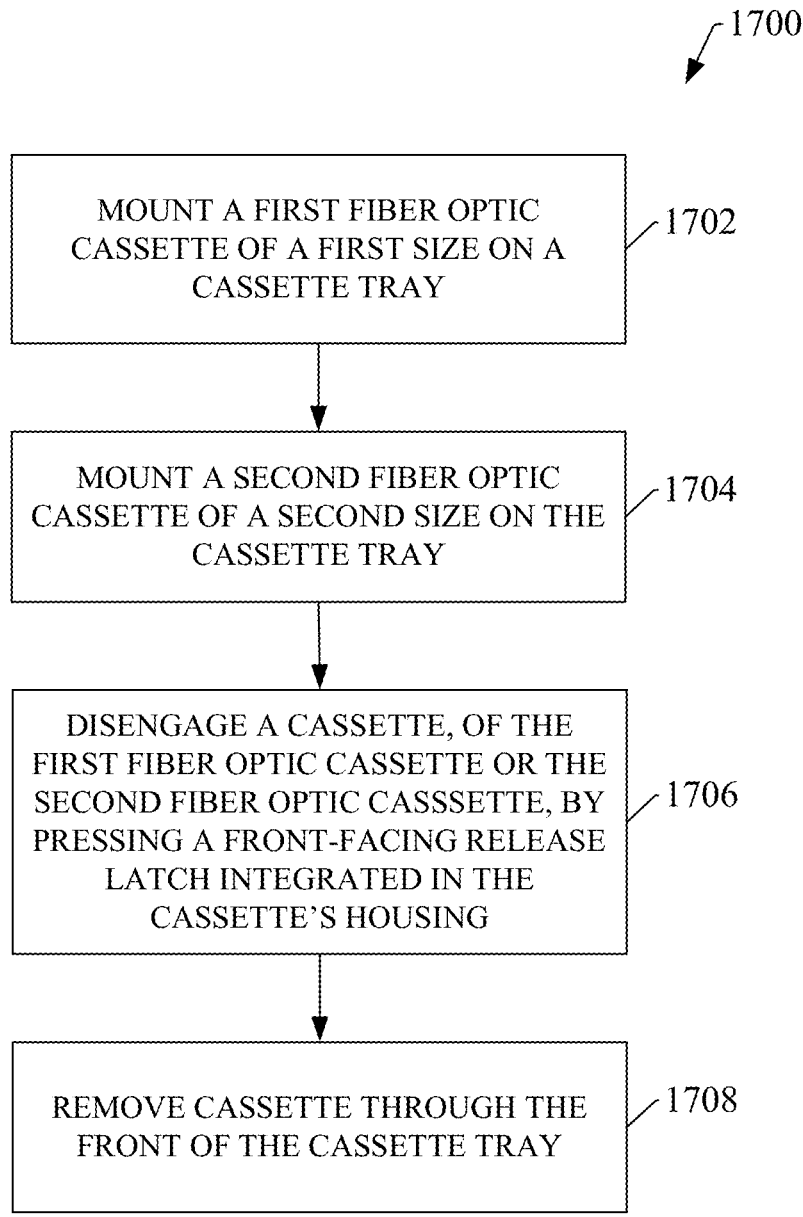
FIG. 17 is a flowchart of an example methodology for mounting fiber optic cassettes on a fiber optic tray or other mounting surface.

FIG. 17 illustrates a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 17 illustrates an example methodology 1700 for mounting fiber optic cassettes on a fiber optic tray or other mounting surface. Initially, at 1702, a first fiber optic cassette of a first size is mounted on a cassette tray. The fiber optic cassette may be, for example, a single-gang cassette or a multi-gang cassette having two or more gangs for housing fiber optic cables or fibers. The fiber optic tray or other mounting surface may comprise a number of parallel rail guides configured to interface with the fiber optic cassette to facilitate guiding the cassette into a correct location and orientation on the tray.

At 1704, a second fiber optic cassette of a second size is mounted on the cassette tray. For example, if the first fiber optic cassette is a single-gang cassette, the second fiber optic cassette maybe a dual-gang cassette or other multi-gang cassette. Structural features of the rail guides and the first and second cassettes allow the first and second cassettes to be installed on the same tray (subject to space limitations of the tray) without structural modification of the mounting interfaces on the tray or the cassettes themselves.

At 1706, one of the first cassette or the second cassette is disengaged from the tray by pressing a front-facing release latch integrated in the cassette's housing. In one or more embodiments, the release latch can be part of a latching mechanism that resides within the cassette housing, and which includes a spring-loaded locking protrusion that engages with an aperture in the tray's surface when the cassette is installed on the tray, thereby locking the cassette in the tray and preventing forward and rearward movement of the cassette. The single locking protrusion of the latching mechanism represents the sole locking point of the cassette. As such, pressing the single release latch disengages the cassette and allows the cassette to travel forward between the two rail guides interfacing with the cassette. At 1708, the cassette is removed through the front of the cassette tray.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A fiber optic cassette mounting system, comprising:
a fiber optic cassette; and
a fiber optic cassette tray comprising rail guides configured to engage with respective rails of the fiber optic cassette, wherein a rail guide, of the rail guides, comprises an elongated portion of a surface of the fiber optic cassette tray that is raised from the surface to form ledges on a left side and a right side of the elongated portion,
wherein the rail guides are configured to hold a single-gang cassette and a multi-gang cassette simultaneously on the fiber optic cassette tray, and
wherein the fiber optic cassette comprises a latching mechanism comprising a latching protrusion configured to engage with an aperture on the fiber optic cassette tray.

2. The fiber optic cassette mounting system of claim 1, wherein the rail guide is notched at a front end of the rail guide to allow a rail of the fiber optic cassette to enter the rail guide under one of the ledges.

3. The fiber optic cassette mounting system of claim 1, wherein the fiber optic cassette is a multi-gang cassette, and comprises at least one clearance area between two gangs of the cassette configured to allow a guide rail to reside between the two gangs when the fiber optic cassette is mounted on the fiber optic cassette tray.

4. The fiber optic cassette mounting system of claim 1, wherein a rail, of the rails of the fiber optic cassette, comprises a notch that engages with a front end of the rail guide to prevent the fiber optic cassette from traveling rearward beyond a stopping position.

5. The fiber optic cassette mounting system of claim 4, wherein the latching protrusion is configured to engage with the aperture in response to the fiber optic cassette reaching the stopping position while being pushed rearward between the rail guide and another rail guide.

6. The fiber optic cassette mounting system of claim 1, wherein the latching mechanism further comprises a release mechanism that faces toward the front of the fiber optic cassette, wherein the release mechanism is configured to disengage the latching protrusion from the aperture in response to pressure being applied to the release mechanism.

7. The fiber optic cassette of claim 6, wherein the release mechanism is configured to rotate about a pivot point in response to the pressure being applied to the release mechanism, and wherein rotation of the release mechanism about the pivot point causes a contact tab on the release mechanism to lift the locking protrusion clear of the aperture.

8. The fiber optic cassette mounting system of claim 6, wherein the latching mechanism is disposed on a left side of the fiber optic cassette, on a right side of the fiber optic cassette, or in an area between two gangs of the fiber optic cassette.

9. The fiber optic cassette mounting system of claim 1, wherein the fiber optic cassette is configured to hold a row of fiber optic adapters disposed on a front edge of the fiber optic cassette, and wherein the fiber optic adapters are configured to receive fiber optic connectors that terminate respective optical fibers.

10. The fiber optic cassette mounting system of claim 1, further comprising an enclosure configured to house the fiber optic tray, wherein the enclosure comprises tray guides disposed on a left inside wall and a right inside wall, respectively, of the enclosure, and wherein the tray guides comprise guide channels configured to engage with a left edge or a right edge of the fiber optic tray.

11. The fiber optic cassette mounting system of claim 1, wherein the fiber optic cassette tray comprises at least two tray levels.

12. A fiber optic cassette, comprising:
a housing comprising at least a first gang and a second gang configured to house optical fibers;
a left rail disposed on a left side of the fiber optic cassette;
a right rail disposed on a right side of the fiber optic cassette;
a clearance area disposed between the first gang and the second gang; and
a latching mechanism disposed within the housing and comprising a spring and a release mechanism that interacts with the spring,
wherein
the left rail and the right rail are configured to engage with corresponding rail guides of a cassette mounting surface to facilitate mounting the fiber optic cassette on the cassette mounting surface,
adjacent rail guides of the cassette mounting surface define a cassette bay configured to receive a single-gang fiber optic cassette, and
the fiber optic cassette is configured to span at least two cassette bays of the cassette mounting surface when mounted on the cassette mounting surface.

13. The fiber optic cassette of claim 12, wherein the clearance area comprises a groove on a lower surface of the housing configured to allow a rail guide of the cassette mounting surface to pass under the fiber optic cassette.

14. The fiber optic cassette of claim 12, wherein the spring comprises a locking protrusion configured to lock within an aperture on the cassette mounting surface when the fiber optic cassette is fully installed between the corresponding rail guides.

15. The fiber optic cassette of claim 14, wherein the release mechanism comprises a release latch that faces outward from a front edge of the fiber optic cassette, and wherein the release mechanism is configured to unlock the locking protrusion from the aperture in response to pressure applied to the release mechanism.

16. The fiber optic cassette of claim 15, wherein the release mechanism is configured to rotate about a pivot point in response to the pressure applied to the release mechanism, and wherein rotation of the release mechanism about the pivot point causes a contact tab on the release mechanism to lift the locking protrusion clear of the aperture.

17. The fiber optic cassette of claim 12, wherein the latching mechanism is disposed on a left side of the housing, on a right side of the housing, or in a middle area of the housing between the first gang and the second gang.

18. The fiber optic cassette of claim 12, further comprising a row of fiber optic adapters disposed along a front edge of the cassette, wherein the fiber optic adapters are configured to receive fiber optic connectors that terminate respective optical fibers.

19. The fiber optic cassette of claim 12, wherein the housing is configured to allow the optical fibers to pass between at least the first gang and the second gang.

20. A fiber optic cassette, comprising:
a housing comprising at least a first gang and a second gang configured to house optical fibers;
a left rail disposed on a left side of the fiber optic cassette;
a right rail disposed on a right side of the fiber optic cassette; and
a clearance area disposed between the first gang and the second gang,
wherein
the left rail and the right rail are configured to engage with corresponding rail guides of a cassette mounting surface to facilitate mounting the fiber optic cassette on the cassette mounting surface,
the clearance area comprises a groove on a lower surface of the housing configured to allow a rail guide of the cassette mounting surface to pass under the fiber optic cassette,
adjacent rail guides of the cassette mounting surface define a cassette bay configured to receive a single-gang fiber optic cassette, and
the fiber optic cassette is configured to span at least two cassette bays of the cassette mounting surface when mounted on the cassette mounting surface.

* * * * *